(No Model.)
I. ZANDER.
JAR HOLDER AND KETTLE COVER.
No. 400,385. Patented Mar. 26, 1889.
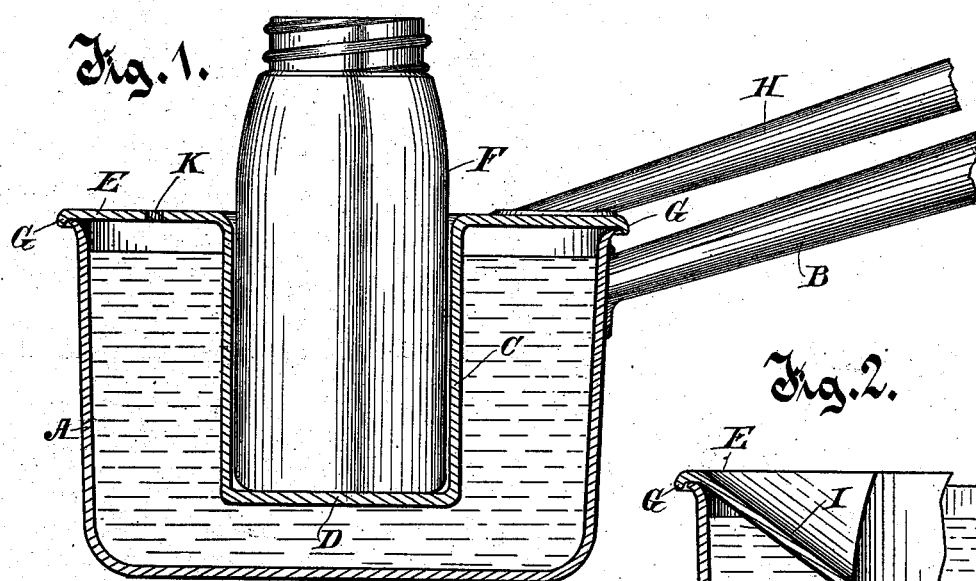
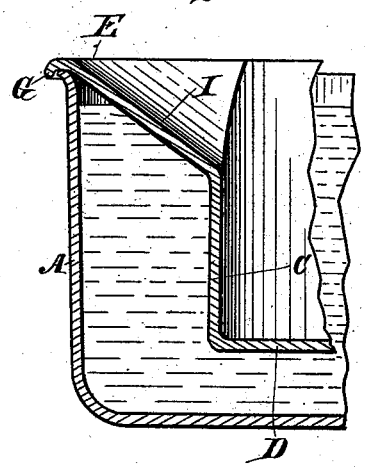
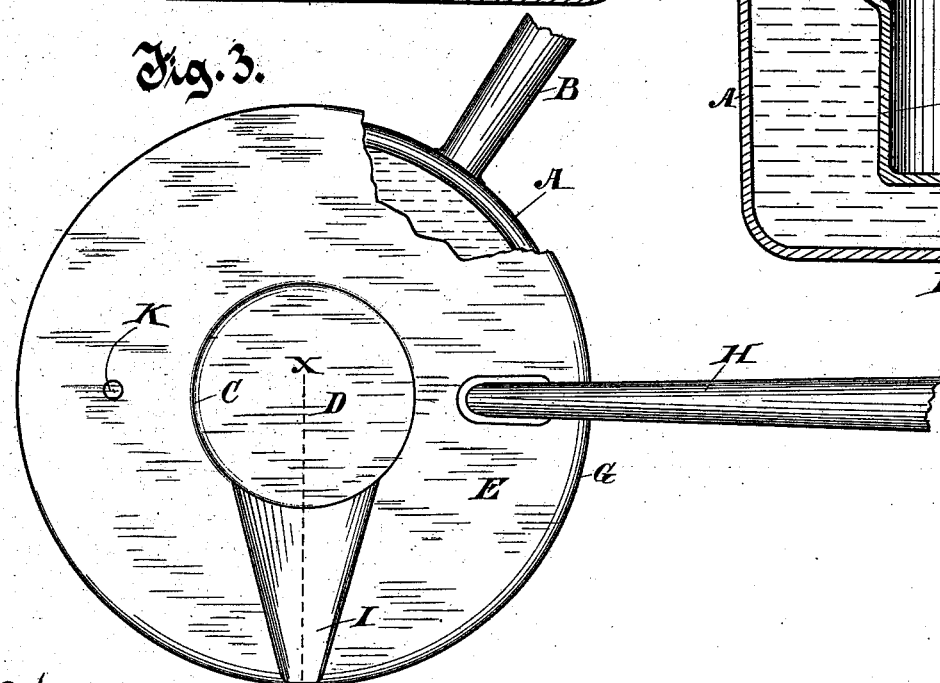
Witnesses:
C. H. Keeney
Anna Faust
Inventor.
Ida Zander
By Ermin & Benedict
Attorneys.

UNITED STATES PATENT OFFICE.

IDA ZANDER, OF MILWAUKEE, WISCONSIN.

JAR-HOLDER AND KETTLE-COVER.

SPECIFICATION forming part of Letters Patent No. 400,385, dated March 26, 1889.

Application filed November 19, 1888. Serial No. 291,222. (No model.)

*To all whom it may concern:*

Be it known that I, IDA ZANDER, of Milwaukee, in the county of Milwaukee and State of Wisconsin, have invented a new and useful Jar-Holder and Kettle-Cover; and I do hereby declare the following to be a full, clear, and exact description of said invention, reference being had to the accompanying drawings, and to the letters or figures of reference marked thereon, which form a part of this specification.

In preserving fruit in the well-known glass fruit-jars it is the practice to put the fruit into the jars when it has been partially prepared for keeping, and thereafter, while in the jar, to heat or scald it, and when so heated to seal the jar hermetically by placing a cap thereon. The handling and sealing of the jar while it and its contents are hot are attended with considerable inconvenience, and one object of my device is to provide a receptacle for receiving the fruit-jar and holding it, whereby it may be handled and sealed conveniently.

Another object of my device is to catch and save the sirup or contents of the jar when, in scalding, it runs over the top of the jar, as is frequently the case, or when a jar breaks, as occasionally occurs, which sirup in such cases, when no other than the devices in common use are used, is likely to be partially or wholly lost.

This device also is so constructed as to properly support the fruit-jar in a bath of hot water and at the same time to provide a cover for the kettle containing the hot water.

In the drawings, Figure 1 is a central vertical section of my device as used in connection with a preserving kettle and jar. Fig. 2 is a central vertical section of a portion of my device and the preserving-jar, made at right angles to the view shown in Fig. 1, that is on line X X of Fig. 3. Fig. 3 is a plan view of the same device shown in Fig. 1.

The same letters refer to like parts in all the views.

A is a preserving-kettle, provided with a handle, B. This kettle in use is intended and adapted to contain water, as shown in Figs. 1 and 2, and to be placed on a stove or range for heating the water therein.

My improved device consists, especially, of the cylindrical hollow case C, having a bottom, D, and at its top the outwardly-projecting flange E. This device may be conveniently made of tin or other sheet metal, and may be made in a single piece or of several pieces secured together, as is most convenient in manufacture. The case A is made of such a diameter laterally as to conveniently receive therein one of the now commonly used fruit-jars F, and is of such depth vertically as preferably to receive one-half or two-thirds of the fruit-jar therein, as shown in Figs. 1 and 2. The flange E projects outwardly far enough to extend over and rest upon the top of a preserving-kettle, A, and is preferably turned down slightly at the edge, forming a rim, as shown at G, for the purpose of holding it in position on the top of the kettle against lateral movement.

It will be seen that this device so constructed forms a cover for the kettle A, and it is also provided with a handle, H, and with a spout, I, which is preferably placed at the side of the cover or at right angles to the handle, as shown in Fig. 3; also, it is desirable to have a small aperture, K, in this flange E, for a vent for the steam arising from the water in the kettle.

It will be understood that the jar F can be placed in this device, and when filled with hot fruit or other material can by this device be conveniently handled, being readily placed in the kettle or removed therefrom or held for sealing the jar hermetically. Other uses of this device, both in connection with fruit-jars and other similar articles, will be readily understood.

What I claim as new, and desire to secure by Letters Patent, is—

1. A jar-holder and kettle-cover consisting of a flat sheet of metal with a downwardly-extending flange at its edge adapted to retain the cover in position on a kettle, which cover is turned downwardly centrally at a distance from its outer edge, forming a single well or receptacle with vertical walls, and an imperforate bottom for the reception of a fruit-jar therein, a spout leading from the well to the outer edge of the cover, and a handle affixed rigidly to the cover for lifting it, in combination with a receiving and supporting kettle, substantially as described.

2. The combination of the receptacle formed of the case C and imperforate bottom D, integral therewith, with the flange E and spout I, substantially as described.

In testimony whereof I affix my signature in presence of two witnesses.

IDA ZANDER.

Witnesses:
C. T. BENEDICT,
JAS. B. ERWIN.